(12) United States Patent
Etemad et al.

(10) Patent No.: US 9,026,051 B2
(45) Date of Patent: May 5, 2015

(54) WIRELESS WIDE AREA NETWORK (WWAN) MANAGED DEVICE TO DEVICE COMMUNICATION USING NARROWBAND WI-FI IN A LICENSED BAND

(71) Applicants: Kamran Etemad, Potomac, MD (US);
Adrian Stephens, Cambridge (GB);
Emily Qi, Portland, OR (US)

(72) Inventors: Kamran Etemad, Potomac, MD (US);
Adrian Stephens, Cambridge (GB);
Emily Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 13/631,015

(22) Filed: Sep. 28, 2012

(65) Prior Publication Data
US 2014/0094122 A1 Apr. 3, 2014

(51) Int. Cl.
*H04B 7/00* (2006.01)
*H04W 76/02* (2009.01)

(52) U.S. Cl.
CPC ..................... *H04W 76/02* (2013.01)

(58) Field of Classification Search
CPC ..... H04W 84/18; H04W 84/12; H04W 88/06; H04W 76/02; H04W 4/02; H04W 24/10; H04M 1/7253
USPC ............... 455/41.2, 41.3, 500, 507, 509, 517, 455/524, 525, 550.1, 552.1, 561; 370/338
See application file for complete search history.

(56) References Cited

U.S. PATENT DOCUMENTS

| | | | |
|---|---|---|---|
| 2008/0130598 A1 | 6/2008 | Kalhan | |
| 2010/0118834 A1 | 5/2010 | Kalhan | |
| 2011/0312331 A1 | 12/2011 | Hakola et al. | |
| 2012/0077510 A1* | 3/2012 | Chen et al. | 455/452.1 |
| 2013/0150058 A1* | 6/2013 | Lim et al. | 455/450 |
| 2014/0031028 A1* | 1/2014 | Yamada et al. | 455/419 |

FOREIGN PATENT DOCUMENTS

| | | |
|---|---|---|
| WO | 2012/091418 A2 | 7/2012 |
| WO | 2012/114161 A1 | 8/2012 |

OTHER PUBLICATIONS

International Search Report and Written Opinion received for PCT Patent Application No. PCT/US2013/048021, mailed on Oct. 18, 2013, 12 pages.

* cited by examiner

*Primary Examiner* — Nhan Le
(74) *Attorney, Agent, or Firm* — Thorpe, North & Western, LLP (57) ABSTRACT

Technology for establishing a device to device (D2D) connection is disclosed. One device comprises a UE that includes a proximity discovery module configured to receive discovery information from at least one of a wireless wide area network (WWAN) and a wireless local area network (WLAN) to assist in establishing a D2D communication channel with at least one additional UE. A D2D communication module is configured to establish the D2D communication channel between the UE and the at least one additional UE using the discovery information. The D2D communication channel is established in a licensed radio frequency band and is managed by the WWAN.

28 Claims, 5 Drawing Sheets

WIRELESS WIDE AREA NETWORK (WWAN) MANAGED DEVICE TO DEVICE COMMUNICATION USING NARROWBAND WI-FI IN A LICENSED BAND

BACKGROUND

As the use of mobile wireless devices, such as smart phones and tablet devices, becomes more ubiquitous, the demands on the limited amount of radio frequency spectrum used by those devices also increases, resulting in wireless network congestion in the licensed spectrum. In addition, the increased use of high bandwidth applications such as audio and video streaming can increase demands beyond the capability of the available spectrum. This is especially true in high density and high use locations such as large cities and universities. One projection estimates a growth of 20 times in mobile internet traffic from 2010 to 2015.

Improvements in wireless architectures, hardware design, and processor speed have significantly increased the efficiency of wireless devices in their use of the available spectrum. However, the ability to transmit a greater number of bits per second per hertz of available bandwidth may be reaching an upper limit with the currently available battery technology.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term D2D refers to device to device communication. The device can be a wireless device capable of communicating in one or more radio frequency bands. The wireless device may be a mobile wireless device such as a smart phone, tablet, laptop, or other type of computing device. The wireless device may also be a simplified computing device, such as a sensor, that is configured to communicate wirelessly. Sensors that are configured to communicate wirelessly are often referred to as machines. The term D2D can be used synonymously herein with peer to peer (P2P) and machine to machine (M2M) communication.

As used herein, the term licensed spectrum or licensed radio frequency band refers to a portion of the radio frequency spectrum that is licensed to one or more entities for communication between mobile wireless devices and at least one transmission station in a wireless wide area network. The spectrum may be licensed by a governmental body such as the Federal Communication Commission or another governmental or industry body authorized to grant radio frequency spectrum permits for use within a selected country.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An exponential increase in the amount of wireless data transmitted has created congestion in wireless wide area networks (WWANs) using licensed spectrum to provide wireless communication services for wireless devices such as smart phones and tablet devices, to name a few. The congestion is especially apparent in high density and high use locations such as urban locations and universities.

One technique for providing additional bandwidth capacity is to use low power wireless communication standards, such as wireless local area network (WLAN) standards to perform device to device (D2D) communication. The use of WLAN standards for D2D communication between devices can significantly decrease the amount of bandwidth used at potential choke points in a WWAN, such as at eNodeBs in a Radio Access Network (RAN) or at core network (CN) servers. Since D2D communication can reduce or eliminate communication via the eNodeB and/or CN, the use of D2D communication can free the RAN and CN to be used for communication over greater distances, such as between RANs in WWAN communication.

However, some types of WWAN standards, such as the third generation partnership project (3GPP) Release 8, 9, 10, or 11, are not fully designed to provide D2D communication. Significant changes to the standards are needed for the physical layer (PHY), Medium Access Control (MAC) layer, support for D2D detection, distributed scheduling, and interference management. Accordingly, it can be difficult to form a D2D communication using a WWAN standard.

One potential solution may be to use a WLAN standard to provide D2D communication between dual mode devices that include both WWAN radios and WLAN radios. However, D2D communication using WLAN standards, such as Bluetooth or the Institute of Electronics and Electrical Engineers (IEEE) 802.11 or 802.15 standards, can also be challenging. Since WLAN standards typically communicate in unlicensed bandwidths, the unlicensed spectrum can be heavily used, thereby resulting in significant interference.

In addition, the WLAN standards are typically designed to provide relatively broadband communication at relatively high radio frequencies. For example, the popular IEEE 802.11a, b, g, and n standards use bandwidths of 20 megahertz (MHz) and 40 MHz to transmit data at a rate of up to 150 Mbit/s per stream. It is often impractical to implement these broad bandwidths and transmission rates in the narrow bandwidths that are available in licensed bands.

The data in unlicensed bands is often transmitted at a center frequency of approximately 2.4 gigahertz (GHz), 3.7 GHz, and/or 5 GHz. These center frequencies can have a relatively high level of attenuation in the atmosphere compared with transmission in licensed bands with a center frequency below 1 GHz. Path Loss through the air can be calculated using:

$$\text{Path Loss} = 20 \log(4*pi*r/\lambda) dB$$

where r is the distance between a transmitter and receiver, and $\lambda$ is the wavelength. The path loss between 900 MHz transmitters ($\lambda$=0.33 meters) and 2.4 GHz transmitters ($\lambda$=0.125 meters) is a ratio of approximately 2.67. Thus, transmission in a 900 MHz band can propagate approximately 2.5 times further than transmission at 2.4 GHz. Thus, D2D communication at the higher frequencies in unlicensed bands is relatively short range, typically less than 100 meters. This range limit can reduce the applicability of D2D communication.

Communication in the sub-gigahertz range of radio frequency waves enables for communication over greater distances. While the use of lower frequency ranges below 1 GHz may reduce the amount of bandwidth, the reduced atmospheric attenuation can result in a higher power signal that can achieve greater spectral efficiency than a signal transmitted in at a multi-gigahertz frequency, such as the unlicensed bands above. This increased spectral efficiency can compensate for the reduced bandwidth by allowing higher levels of modulation and coding to be used to transmit a higher number of bits per second per hertz.

The Institute of Electronics and Electrical Engineers (IEEE) 802.11 family of standards has recently began work on a new working group designated as 802.11ah. The amendments proposed by the working group to the IEEE 802.11 family of standards will be referred to herein as the IEEE 802.11ah standard. One example of the progress made to date on the IEEE 802.11ah standard is release 10 of the specification framework in July of 2012 that is designated as 802.11-11/1137r10.

The IEEE 802.11ah standard is the first standard in the IEEE 802.11 family of standards that is designed to operate in a channel with a center frequency below 1 GHz. To accommodate the lower center frequency, the IEEE 802.11ah standard proposes the use of narrower channels relative to the 802.11a, b, g, and n standards. The channel bandwidths for the IEEE 802.11ah standard can have a bandwidth of 1 MHz, 2 MHz, 4 MHz, or 16 MHz. The narrower channel sizes, relative to IEEE 802.11a, b, g and n, and the relatively low center frequencies can be used to enable sensors to communicate over medium range distances, such as around 250 meters. This distance is significantly farther than typical communication distances for IEEE 802.11 standards, which are typically limited to a maximum distance of about 100 meters.

In contrast with WLAN communications, which typically involve relatively broad bandwidths (40 MHz) and operation over relatively short ranges (i.e. 100 meters) at relatively high frequencies (2.4 GHz, 5 GHz), WWAN communications, such as WWAN communications via the 3GPP specification, are typically accomplished at lower bandwidths (700 MHz to 2 GHz), lower bandwidths (1.4, 3, 5, 10, 15, or 20 MHz), and operation over relatively long distances (up to several kilometers).

In accordance with one embodiment of the present invention, technology for forming a WWAN controlled, D2D communication radio link in a licensed radio frequency band is disclosed. The D2D communication radio link can be formed based on a WLAN D2D standard. Many types of WLAN standards may not be compatible with WWAN frequencies and bandwidths. However, WLAN standards such as the IEEE 802.11ah standard can be more compatible with the licensed spectrum used in WWAN communication due to the relatively low channel bandwidths and low center frequencies used in the IEEE 802.11ah standard. While the IEEE 802.11ah standard is used as an example, it is not intended to be limiting. Other standards within the IEEE 802.11-2012 family of standards and IEEE 802.15 standard may also be used to form a D2D connection between UEs that is setup and managed using a WWAN connection.

Figure 1:
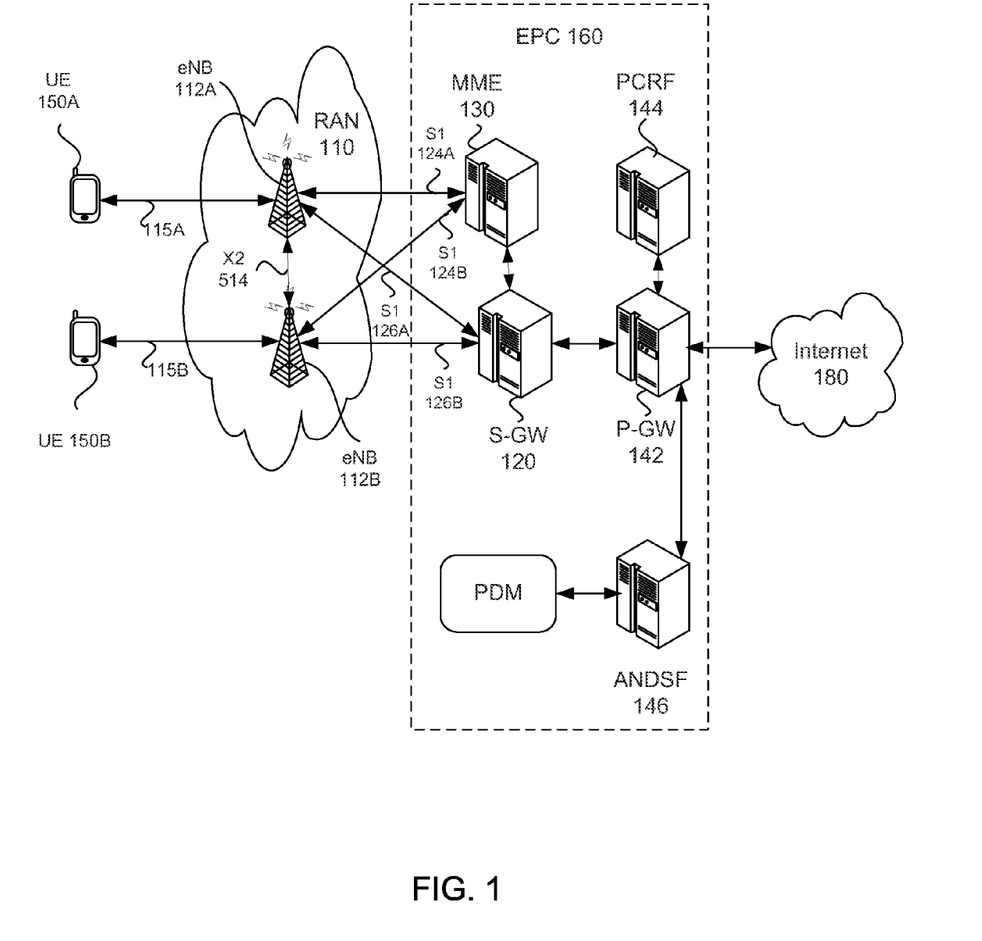
FIG. 1 illustrates a block diagram of an example of a third generation partnership project (3GPP) long term evolution (LTE) network.

A brief discussion of 3GPP architecture is provided for context. FIG. 1 provides an example of a 3GPP LTE network, as described in the 3GPP Release 8, 9, 10 and 11 specifications. In the 3GPP LTE network, UEs 150A-B can communicate with an Evolved Packet Core (EPC) 160 via a Radio Access Network (RAN) 110. The RAN can include transmission nodes such as the evolved universal terrestrial radio access (E-UTRAN or eUTRAN) or UTRAN modules, represented as the eNodeBs 112A and 112B. The RAN can be in communication with the EPC. The EPC can include a serving gateway (S-GW) 120 and a mobility management entity (MME) 130. The EPC can also include a packet data network (PDN) gateway (P-GW) 142 to couple the S-GW to a PDN, such as the Internet 180, an intra-net, or other similar network. The S-GW can provide P2P internet network access and standard network access for the UEs associated with the RAN. The S-GW and MME can be in direct communication with each other via cabling, wire, optical fiber, and/or transmission hardware, such a router or repeater. The eNodeBs 112A-B are connected to the UEs 150A-B via an LTE radio link 115 A-B, respectively, in this example. A backhaul link 114, such as an X2 link, can be used to connect the eNBs. The X2 link is typically formed over a broadband wired or optical connection between the eNBs. Connections between the eNBs 112A-B, the S-GW 120, and the MME 130 can be made via S1 type connections 124A-B, and 126A-B. The S1 interface is described in 3GPP Technical Specification (TS) 36.410 versions 8 (2008-12-11), 9 (2009-12-10) and 10 (2011-03-23), which are available to the public.

The EPC 160 can also include a Policy and Charging Rules Function (PCRF) node 144 that can be used to determine, in near real time, policy rules of a Mobile Network Operator (MNO) in the wireless network. The PCRF node can access subscriber databases and other specialized functions, such as charging systems, as can be appreciated. Additional policies can be added to identify, in near real time, when an MNO can configure a network to form a D2D connection between at least two wireless devices. As used herein, an MNO is a wireless network service provider. The wireless devices may both be in the MNO's network. Alternatively, one of the wireless devices may operate in another MNO's network.

The EPC 160 can also include an Access Network Discovery and Selection Function (ANDSF) 146. The purpose of the ANDSF is to assist the UEs 150A-B to discover non-3GPP access networks, such as an IEEE 802.11, IEEE 802.15 or IEEE 802.16 network, that can be used for data communications in addition to 3GPP access networks (such as HSPA or LTE) and to provide the UE with rules policing the connection to these networks.

Figure 2A:
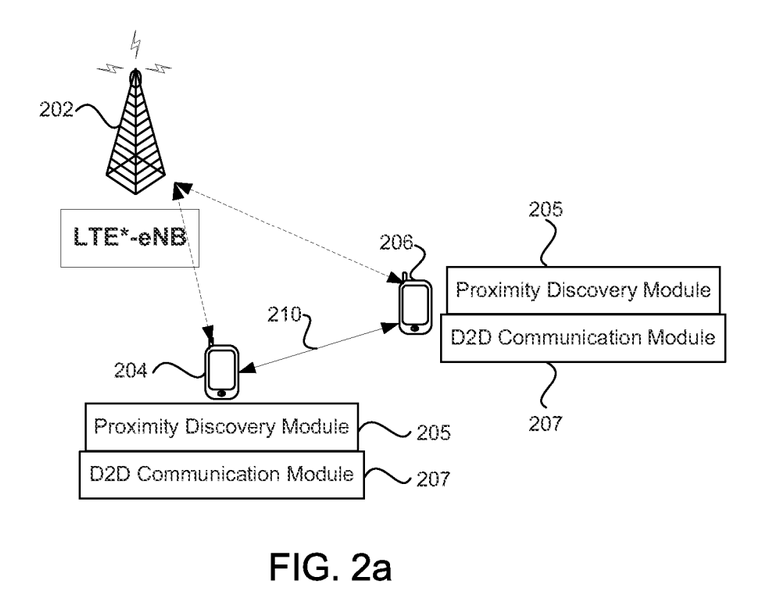
FIG. 2a illustrates a block diagram of an example of a wireless wide area network (WWAN) configured to communicate with a plurality of user equipment (UEs) to assist in establishing a device to device connection between the UEs in accordance with an example.
Figure 2B:
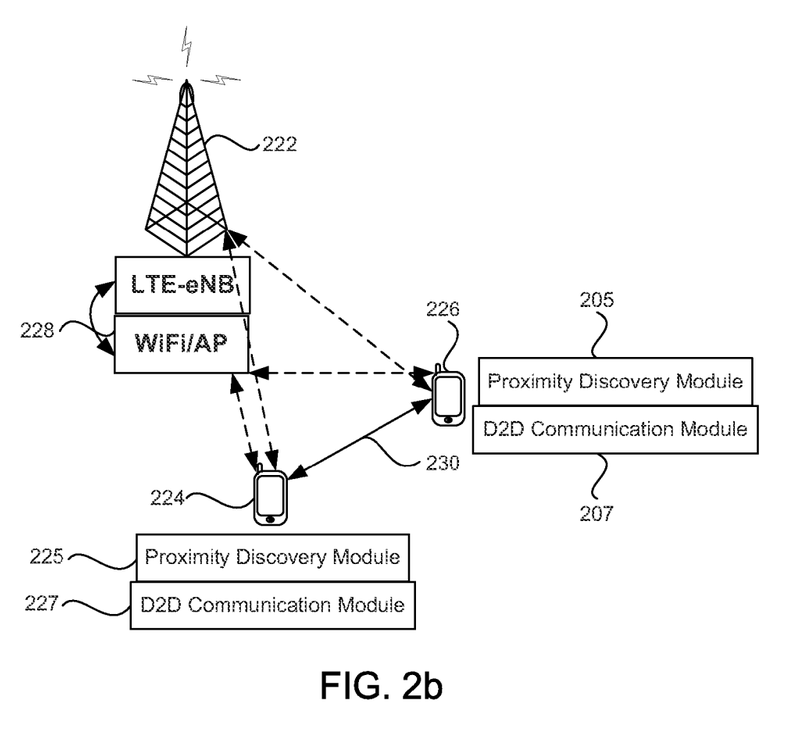
FIG. 2b illustrates an example of a WWAN in communication with a wireless local area network, at least one of the networks configured to communicate with a plurality of UEs to assist in establishing a D2D connection between the UEs in accordance with an example.

With an understanding of the basic architecture of a 3GPP network, examples are provided of system architectures that can be used to provide the operations of network assisted proximity discovery, proximity detection, and WWAN assisted D2D communication in licensed bands, as illustrated in FIGS. 2a and 2b.

FIG. 2a provides an example illustration of a WWAN configured to communicate with a plurality of UEs. In this example, the WWAN access is based on the 3GPP LTE standard, including Releases 8, 9, 10 and 11. Network assisted proximity and discovery information can be communicated to UE1 204 and UE2 206 using an enhanced Node B (eNB) 202. The eNB can be used to communicate with an EPC via a control plane connection with the WWAN.

The eNodeB 202 can be a high power node, such as a macro node, that is configured to transmit and receive signals from UEs over a distance of multiple kilometers. Alternatively, the eNodeB may be a Low Power Node (LPN), such as a micro cell, a pico cell, a femto cell, a Home eNodeB, and so forth. The LPN can be configured to communicate with the UEs over a distance of less than one kilometer.

In one embodiment, a Proximity Discovery Module (PDM) can be implemented in the 3GPP network in one or more of the following nodes, including: a) an eNodeB; b) an MME; c) an ANDSF; and d) a new proximity server in the mobile network operator (MNO). In FIG. 1, the PDM is illustrated as being in communication with the ANDSF, but this is not intended to be limiting. The PDM can be configured to communicate network assisted proximity discovery information to UE1 and UE2. The PDM may also be located at other nodes that allow the PDM to communicate with the UE(s) in a WWAN network. In one embodiment, the ANDSF can include a list of WLAN networks that may be available in the vicinity of a UE and information that can be used to assist the UEs to expedite the connection to the WLAN network(s).

The proximity discovery information can include information that can be used by the UEs to detect proximity and perform D2D communication via a WLAN. A D2D module located at each UE can be configured to communicate with the PDM in the 3GPP network or the MNO.

In one embodiment, the proximity discovery information can include a group owner status. The group owner status can be identified and communicated from the PDM to a selected UE via the WWAN. The group owner status designates that a selected UE will be the master in a D2D communication with one or more other UEs. The group owner status may be determined by the PDM. The designation of one UE as a group owner may be based on signal strength of the UE with the RAN, the capabilities of the UE, selected at random between two or more UEs in the 3GPP network, the user who financially sponsors the D2D communications, e.g. advertisers/sellers, or based on other desired metrics, as can be appreciated.

In one example, the network assisted proximity discovery information can also include an identification value for UE1 and UE2 and a transmit WLAN channel on which the D2D communication will take place. For example, the transmit WLAN channel may be a channel selected for communication via an IEEE 802.11 communication standard, an IEEE 802.15 communication standard, a Bluetooth standard, or another WLAN standard used to form a D2D communication link between UE1 204 and UE2 206.

In one embodiment, the network assisted proximity discovery information can also include: a) a P2P Group Basic Service Set Identification (BSSID); b) a peer to peer (P2P) interface Medium Access Control (MAC) address for UE1 and a P2P interface MAC address for UE2; and c) a D2D transmit/receive channel. The P2P Group BSSID and P2P interface MAC address for each UE may optionally be derived from the UE1 ID and/or the UE2 ID. The transmit channel can include channel information including frequency, bandwidth, power level and transmission intervals, Once the proximity detection information is received via the WWAN network, proximity detection can be performed based on the proximity discovery information received at each UE. For example, the group owner UE may scan for the other UE that was identified in the proximity discovery information. The UE may scan on the transmit WLAN channel. The non-group owner UE can listen on the listen WLAN channel. In one embodiment, the group owner UE may transmit the P2P Group BSSID on the transmit channel. The non-group owner UE can be configured to scan for the P2P Group BSSID on the listen WLAN channel.

In the example illustrated in FIG. 1, UE1, the group owner, can transmit the P2P Group BSSID via the WLAN to UE2. UE1 can then communicate with UE2 via the WLAN on the transmit channel and the listening channel. The WLAN may be based on standards including Bluetooth, IEEE 802.11, including IEEE 802.11ah, IEEE 802.15, or another WLAN standard, as previously discussed.

Once the proximity discovery information has been communicated by the WWAN network to the UEs and the proximity detection has been performed on the control plane, a D2D communication link 210 can be established between UE1 and UE2 in the data plane. In the example of FIG. 2a, the D2D communication link is formed directly between UE1 204 and UE2 206. Each of the UEs can include a proximity discovery module 205 and a D2D communication module 207. The modules will be further discussed in the proceeding paragraphs.

The D2D communication link 210 can be a WiFi direct mode link. Such direct operation may be purely adhoc or may be managed through the WiFi AP 228. In one embodiment, the operating channel frequency of the D2D communication link and the bandwidth of the channel may be selected by the WiFi AP. There may be no standardized interface through which the selection of center frequency and bandwidth of the channel is managed.

In FIG. 2b, the proximity discovery information may be communicated either directly from the eNB 222 to UE1 224 and UE2 226. Alternatively, the proximity discovery information may be communicated from the eNB to a WLAN Access Point (AP) such as a WiFi AP 228. The proximity discovery information can then be used to setup a D2D communication channel 230 between UE1 and UE2 using a WLAN standard, such as IEEE 802.11ah to form a WiFi direct D2D communication channel between UE1 and UE2 using the proximity discovery module 225 and the D2D communication module 227 residing on each UE. The modules will be further discussed in the proceeding paragraphs.

The WiFi AP 228 can be separate from and in communication with the eNB 222. Alternatively, the WiFi AP can be integrated with the eNB. For example, the eNB may be an LPN, with an effective communication range that is approximately the same as the WiFi AP.

In the examples of FIGS. 2a and 2b, the D2D communication channel 210, 230, respectively, can be selected to operate in a licensed band of the radio frequency spectrum. The operation of the D2D communication channel in the licensed radio frequency spectrum can allow the channel to be controlled using the WWAN to manage the D2D communications.

The radio frequency spectrum used for the D2D communication channel in the licensed spectrum may include some unused time domain division (TDD) spectrum. Alternatively, the spectrum can include the uplink (UL) portion of a frequency domain division (FDD) allocation. The operation of a WiFi direct D2D communication channel in a licensed portion of the radio frequency spectrum can be referred to as "licensed narrowband Wi-Fi (LNB-WiFi)". The use of LNB-WiFi can be applicable for some public safety related usage and spectrum where D2D communications are expected.

The narrowband nature of WiFi channels, operating based on the IEEE 802.11ah standard, has multiple benefits for D2D usage in the licensed spectrum. The benefits include the use of higher power per tone due to the use of relatively low center frequencies (less than 2 GHz and often less than 1 GHz) based on of the IEEE 802.11ah standard, as previously discussed. The higher power per tone leads to communication over an extended rage relative to previously released standards in the IEEE 802.11 family, such as IEEE 802.11a, b, g or n.

Another benefit includes the usage of the WiFi direct channel with narrow bandwidths, which can be as narrow as 1 or 2 MHz. As previously discussed, broader bandwidths of 20 MHz or 40 MHz may be difficult or impossible to implement in radio frequency spectrum used for WWAN communications, where spectrum in limited and the carrier frequency bandwidths are typically less than 20 MHz.

The narrowband nature of the WiFi channels can also enable selective activation and transmission of specific WiFi channels resulting in better flexible interference management.

The WWAN can also be used to manage the D2D communication channel after it has been setup. For example, the 3GPP radio access network (RAN) can configure and control a variety of parameters on a WiFi direct carrier operating in a licensed band. For example, one parameter that can be managed includes the management of slow transmit (Tx) power control by radio link monitoring.

The WWAN can also be used to manage transmission opportunities. A WiFi direct D2D link can offer various means for channel access. WiFi normally relies on a distributed contention-based mechanism, such as enhanced distributed channel access (EDCA), in which the wireless mobile devices individually contend for channel access and then use the channel for a period of time. This process is managed through the EDCA parameters. The WiFi AP can advertise EDCA parameters, as defined in the IEEE Std. 802A1-2012.

A polled channel access mechanism, such as a hybrid coordination function controlled channel access (HCCA) is also defined in the IEEE Std. 802.11-2012, which provides fine (i.e. 1 to 10 milliseconds) time-based control of transmit activity. This mechanism can be adapted to external control using, for example, the 3GPP WWAN. Once D2D discovery is completed, the use of HCCA via the WWAN can be made available. The HCCA via the WWAN can be used for interference management and resource management during high D2D traffic loads. The WWAN can provide more accurate time-based control of transmit activity than can typically be accomplished using the WLAN.

In one example embodiment, the transmission opportunities can be applied at a management layer for semi-static control of WiFi-direct. Alternatively, the transmission opportunities can be applied more dynamically through RRC messaging. For example, a new information element can be communicated as either a broadcast message (such as a new system information block (SIB)) or through dedicated signaling, such as using the RRCConnectionReconfiguration message.

The use of a WWAN, such as 3GPP, to manage a D2D connection between two or more UEs allows the devices to be managed even when they are outside the range of a WLAN, such as a WiFi AP, or a WiFi AP is not available to manage the connection. The use of the 3GPP to manage an LNB-WiFi connection enables D2D connections between two or more devices to be formed substantially anywhere that WWAN coverage exists. With WWAN coverage nearly omnipresent in populated areas, this significantly increases the locations and ability to form a D2D connection independent of availability of WLAN networks.

In one embodiment, an LNB-WiFi connection can be a viable solution for public safety D2D applications and usage. For example, the LNB-WiFi connection can be formed in the 700 MHz public safety band, which includes 763-768 MHz and 793-798 MHz for broadband communications, along with 769-775 MHz and 799-805 MHz for narrowband allocations. The sub-gigahertz frequencies and narrowband allocations match well with the use of a D2D LNG-WiFi connection formed based on the IEEE 802.11ah standard.

Both 3GPP LTE based or WiFi based carriers designated for D2D carriers can use licensed or unlicensed TDD spectrum or a portion of an uplink (UL) band of an FDD allocation. The DL portion of the FDD allocation may be paired with the UL of another FDD carrier using carrier aggregation (CA) principles, as disclosed in 3GPP LTE Release 10 or 11. The downlink can be used as a new carrier type (i.e. an extension carrier) or a backward compatible carrier.

The use of a WLAN standard to form the D2D communication channel can provide significant benefits. A WiFi radio's MAC layer and physical (PHY) layer are already designed for direct communication and may be used for some public safety applications with a faster time to market and less standardization efforts, which leads to lower costs. In addition, piggy backing on current initiatives to use WiFi in lower frequency bands and with narrow bandwidth carriers can reduce standardization costs. Also, the use of lower frequency bands and narrow bandwidth carriers can provide higher transmit power in public safety bands. Also, additional implementation requirements specifically imposed for public safety usage for special devices, such as higher gain antennas or lower noise figure, can further improve system gain. These effects can result in a considerable link margin gain, which can translate to the ability to communicate over an extended range.

Figure 3:
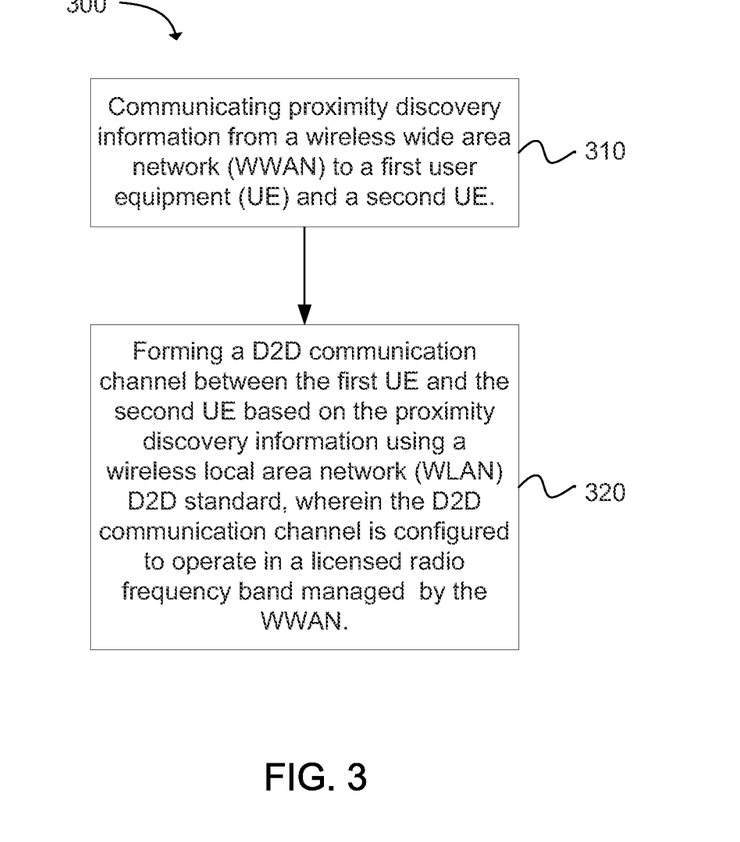
FIG. 3 illustrates a flow chart depicting a method for forming a device to device (D2D) communication radio link in accordance with an example.

In accordance with one embodiment, a method 300 for forming a device to device (D2D) communication radio link is disclosed, as depicted in the flow chart of FIG. 3. The method comprises the operation of receiving proximity discovery information from a wireless wide area network (WWAN) at a first user equipment (UE) and a second UE, as shown in block 310. An additional operation involves forming a D2D communication channel between the first UE and the second UE based on the proximity discovery information, as shown in block 320. The D2D communication channel is formed using a wireless local area network (WLAN) D2D standard. The D2D communication channel is configured to operate in a licensed radio frequency band managed by the WWAN.

The method 300 can further comprise forming the D2D communication between the first UE and the second UE using the WLAN D2D standard that is selected from the group of standards consisting of: Institute of Electronics and Electrical Engineers (IEEE) 802.11a, 802.11b, 802.11g, 802.11n, 802.11ah, and IEEE 802.15. As previously discussed, one example of the progress made to date on the IEEE 802.11ah standard is release 10 of the specification framework in July of 2012 that is designated as 802.11-11/1137r10.

The method 300 can further comprise the operations of receiving a plurality of D2D communication channels from the WWAN, that are located within the licensed radio frequency band, at at least one of the first UE and the second UE; and selecting, at one of the first UE and the second UE, one of the plurality of D2D communication channels based on measurement attributes of the plurality of D2D communication channels to form the D2D communication channel between the first UE and the second UE.

In one embodiment, a D2D communication channel can be selected at a carrier frequency and with a bandwidth that is determined by the WWAN and indicated to one of the first UE and the second UE. The WWAN can be a radio access network (RAN) configured to operate based on a third generation partnership project (3GPP) specification Release 8, 9, 10 or 11. The D2D communication channel can be formed with a channel bandwidth of less than or equal to 1 MHz to provide an increased power per tone relative to higher channel bandwidths. Alternatively, the channel bandwidth may be wider. For example, the channel bandwidth may be selected from the group consisting of 1 MHz, 2 MHz, 4 MHz, 8 MHz, and 16 MHz based on selected parameters between the UEs in the D2D connection such as a required data rate and a distance between the first UE and the second UE. In one embodiment, the licensed frequency band can operate in a radio frequency band designated for public safety, as previously discussed.

The method 300 can further comprise receiving the proximity discovery information at the first UE and the second UE using the WWAN, wherein the WWAN is a radio access network (RAN) configured to operate based on a third generation partnership project (3GPP) specification Release 8, 9, 10 or 11. An additional operation can involve monitoring the D2D communication radio link, using a Received Signal Strength Indicator (RSSI), or a packet error rate (PER), to enable the WWAN to provide dynamic slow transmit power control. A further operation can include configuring time intervals for D2D transmissions between the first UE and the second UE, wherein the time intervals are configured by the WWAN to reduce interference and manage radio spectrum resources.

In one embodiment a distributed contention-based mechanism or polled channel access mechanism can be used to select transmissions during intervals. The distributed contention based mechanism and the polled channel access mechanism can be configured by the WWAN.

In another embodiment, the proximity discovery information can be communicated from the WWAN to the first UE and the second UE using radio resource control (RRC) messaging. The proximity discovery information can comprise: a carrier frequency for the D2D communication channel; a bandwidth for the D2D communication channel; a power level for the D2D communication channel; and transmission intervals for communication in the D2D communication channel.

In one embodiment, the proximity discovery information and D2D channel parameters can be communicated from the WWAN to the first UE and the second UE using management level signaling of the WLAN.

While examples of a D2D connection formed between a first UE and a second UE are disclosed, they are not intended to be limiting. There can be a plurality of UEs configured to communicate with at least one of the first UE and the second UE via the D2D communication channel.

In another embodiment, a user equipment (UE) operable to establish a device to device (D2D) communication radio link is disclosed. Returning to FIGS. 2a and 2b, the UE 224 comprises a proximity discovery module 225 configured to receive discovery information from at least one of a wireless wide area network (WWAN) 222 and a wireless local area network (WLAN) 228 to assist in establishing a D2D communication channel 230 with at least one additional UE 226. A D2D communication module 227 is configured to establish the D2D communication channel 230 with the at least one additional UE 226 using the discovery information. The D2D communication channel is established in a licensed radio frequency band and is managed by the WWAN.

In one embodiment, both the first UE 224 and the additional UE 226 include a proximity discovery module 225 and a D2D communication module 227. The discovery information communicated to each UE can include: a D2D communication channel carrier frequency in the licensed radio frequency band; a D2D communication channel bandwidth; a D2D communication channel power; and transmission intervals for communication in the D2D communication channel. The D2D communication channel bandwidth can selected from the group consisting of 1 MHz, 2 MHz, 4 MHz, and 16 MHz bandwidth, as previously discussed. The D2D communication channel is formed using a WLAN standard selected from the group of standards consisting of: Institute of Electronics and Electrical Engineers (IEEE) 802.11a, 802.11b, 802.11g, 802.11n, 802.11ah, and IEEE 802.15. A distributed contention-based mechanism or polled channel access mechanism can be used to select the transmission intervals, wherein the distributed contention based mechanism and the polled channel access mechanism are configured by the WWAN.

Figure 4:
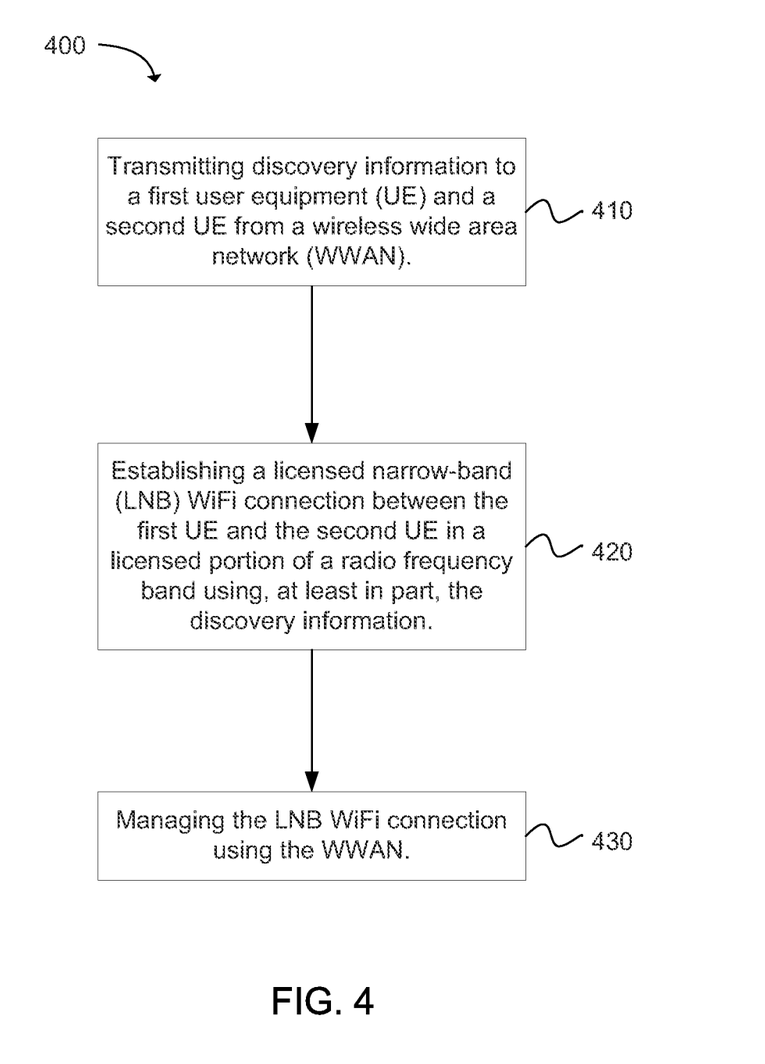
FIG. 4 illustrates a flow chart depicting a method for establishing a device to device (D2D) communication channel in accordance with an example.

In another embodiment, a method 400 for establishing a device to device (D2D) communication channel is disclosed, as depicted in the flow chart of FIG. 4. In one embodiment, the method can be implemented on a non-transitory machine readable storage medium comprising a plurality of instructions adapted to be executed to implement the method.

The method 400 comprises transmitting discovery information to a first user equipment (UE) and a second UE from a wireless wide area network (WWAN), as shown in block 410. Alternatively, the discovery information may be communicated from a WLAN in communication with the WWAN. The method further comprises establishing a licensed narrow-band (LNB) WiFi connection between the first UE and the second UE in a licensed portion of a radio frequency band using, at least in part, the discovery information, as shown in block 420. The method also includes the operation of managing the LNB WiFi connection using the WWAN, as shown in block 430.

The method 400 can further comprise communicating the discovery information to the first UE and the second UE using at least one of: broadcasting a new system information block (SIB) and using dedicated radio resource control (RRC) signaling to transmit an RRCConnectionReconfiguration message to each of the first UE and the second UE.

In one embodiment, managing the LNB WiFi connection using the WWAN can further comprise using a distributed contention-based mechanism or polled channel access mechanism to select the transmission intervals, wherein the distributed contention based mechanism and the polled channel access mechanism are configured by the WWAN.

The method 400 can further comprise establishing the licensed narrow-band (LNB) WiFi connection between the first UE and the second UE in the licensed portion of the radio frequency band. The licensed portion of the radio frequency band can be designated for public safety.

The method 400 can further comprise forming the D2D communication between the first UE and the second UE using the WLAN D2D standard that is selected from the group of standards consisting of: Institute of Electronics and Electrical Engineers (IEEE) 802.11a, 802.11b, 802.11g, 802.11n, 802.11ah and IEEE 802.15. A plurality of D2D communication channels can be communicated from the WWAN, that are located within the licensed radio frequency band, to at least one of the first UE and the second UE. The first UE or the second UE can select one of the plurality of D2D communication channels based on measurement attributes of the plurality of D2D communication channels to form the D2D communication channel between the first UE and the second UE.

The method 400 can further comprise selecting a D2D communication channel at a carrier frequency and with a bandwidth that is determined by the WWAN and indicated to one of the first UE and the second UE. In one embodiment, a D2D communication channel can be selected at a carrier frequency and with a bandwidth that is determined by the WWAN. The WWAN can be a radio access network (RAN) configured to operate based on a third generation partnership project (3GPP) specification Release 8, 9, 10 or 11.

The method 400 can further comprise forming the D2D communication channel with a channel bandwidth of less than or equal to 1 MHz to provide an increased power per tone relative to higher channel bandwidths. In addition to the 1 MHz channel bandwidth, the D2D communication may be formed with a channel bandwidth selected from the group consisting of 2 MHz, 4 MHz, 8 MHz, and 16 MHz based on a required data rate and a distance between the first UE and the second UE.

The method 400 can further comprise communicating the proximity discovery information to the first UE and the second UE using the WWAN, wherein the WWAN is a radio access network (RAN) configured to operate based on a third generation partnership project (3GPP) specification Release 8, 9, 10 or 11.

In another embodiment, a UE operable to establish a device to device (D2D) communication radio link is disclosed. The UE can comprise a proximity discovery module configured to receive discovery information from at least one of a wireless wide area network (WWAN) and a wireless local area network (WLAN) to assist in establishing a D2D communication channel with at least one additional UE. The UE can further comprise a D2D communication module configured to establish the D2D communication channel with the at least one additional UE using the discovery information, wherein the D2D communication channel is established in a licensed radio frequency band and is managed by the WWAN.

In one embodiment, the discovery information received by the proximity discovery module can comprise a D2D communication channel carrier frequency in the licensed radio frequency band; a D2D communication channel bandwidth; a D2D communication channel power; and transmission intervals for communication in the D2D communication channel.

As previously discussed, the D2D communication channel bandwidth can be selected from the group consisting of 1 MHz, 2 MHz, 4 MHz, and 16 MHz. The D2D communication channel can be formed using a WLAN standard selected from the group of standards consisting of: Institute of Electronics and Electrical Engineers (IEEE) 802.11a, 802.11b, 802.11g, 802.11n, 802.11ah, and IEEE 802.15.

In one embodiment, a distributed contention-based mechanism or polled channel access mechanism can be used by the UE to select the transmission intervals. The distributed contention based mechanism and the polled channel access mechanism can be configured by the WWAN.

Figure 5:
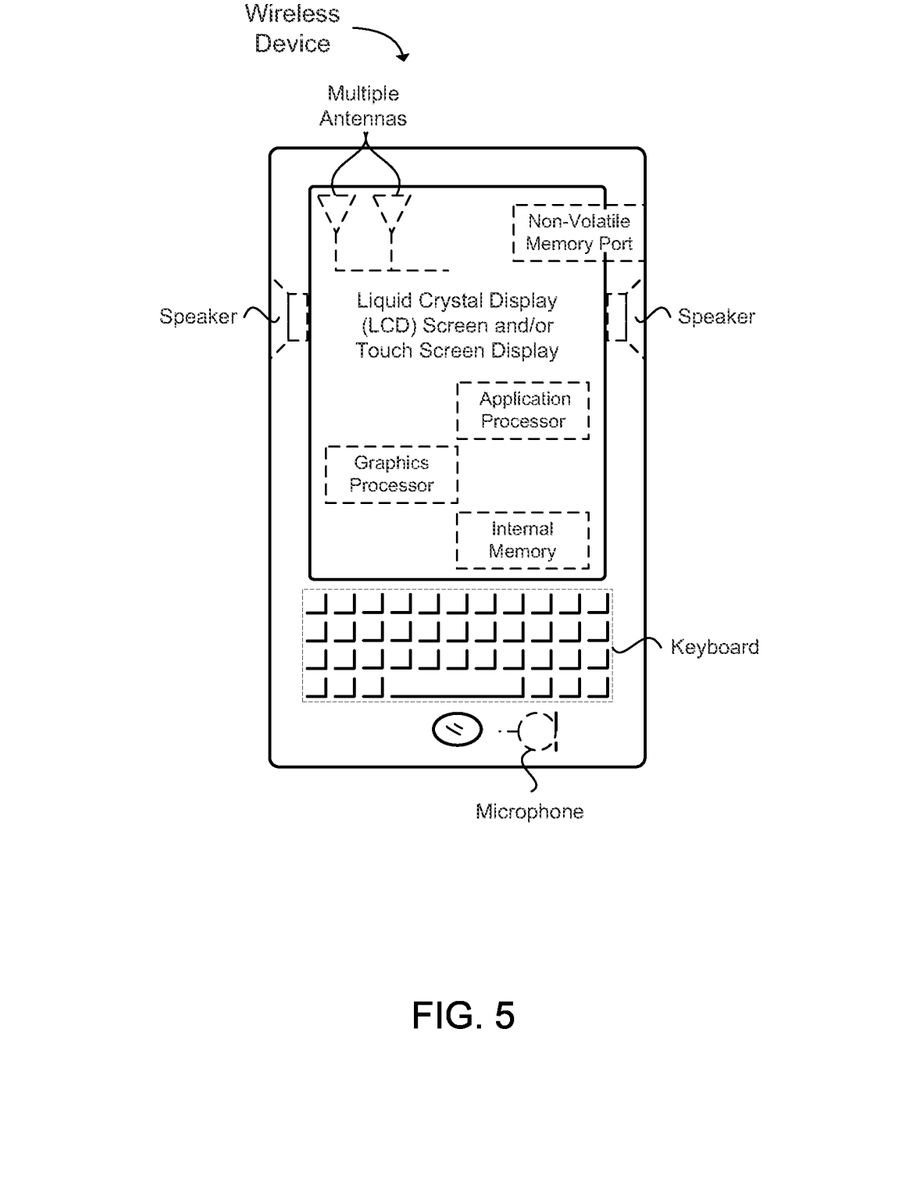
FIG. 5 illustrates a mobile wireless device in accordance with an example.

FIG. 5 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 5 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for forming a device to device (D2D) communication radio link, comprising:
   receiving proximity discovery information from a wireless wide area network (WWAN) at a first user equipment (UE) and a second UE;
   forming a D2D communication channel between the first UE and the second UE based on the proximity discovery information using a wireless local area network (WLAN) D2D standard, wherein the D2D communication channel is configured to operate in a licensed radio frequency band managed by the WWAN.

2. The method of claim 1, further comprising forming the D2D communication between the first UE and the second UE using the WLAN D2D standard that is selected from the group of standards consisting of: Institute of Electronics and Electrical Engineers (IEEE) 802.11a, 802.11b, 802.11g, 802.11n, 802.11ah, and IEEE 802.15.

3. The method of claim 1, further comprising:
   receiving a plurality of D2D communication channels from the WWAN, that are located within the licensed radio frequency band, at at least one of the first UE and the second UE; and
   selecting, at one of the first UE and the second UE, one of the plurality of D2D communication channels based on measurement attributes of the plurality of D2D communication channels to form the D2D communication channel between the first UE and the second UE.

4. The method of claim 1, further comprising selecting a D2D communication channel at a carrier frequency and with a bandwidth that is determined by the WWAN and indicated to one of the first UE and the second UE.

5. The method of claim 1, further comprising selecting a D2D communication channel at a carrier frequency and a with a bandwidth that is determined by the WWAN, wherein the WWAN is a radio access network (RAN) configured to operate based on a third generation partnership project (3GPP) specification Release 8, 9, 10 or 11.

6. The method of claim 1, further comprising forming the D2D communication channel with a channel bandwidth of less than or equal to 1 MHz to provide an increased power per tone relative to higher channel bandwidths.

7. The method of claim 1, further comprising forming the D2D communication with a channel bandwidth selected from the group consisting of 1 MHz, 2 MHz, 4 MHz, 8 MHz, and 16 MHz based on a required data rate and a distance between the first UE and the second UE.

8. The method of claim 1, further comprising receiving the proximity discovery information at the first UE and the second UE from the WWAN, wherein the WWAN is a radio access network (RAN) configured to operate based on a third generation partnership project (3GPP) specification Release 8, 9, 10 or 11.

9. The method of claim 1, further comprising monitoring the D2D communication radio link, using a Received Signal Strength Indicator (RSSI), or a packet error rate (PER), to enable the WWAN to provide dynamic slow transmit power control.

10. The method of claim 1, further comprising configuring time intervals for D2D transmissions between the first UE and the second UE, wherein the time intervals are configured by the WWAN to reduce interference and manage radio spectrum resources.

11. The method of claim 1, further comprising using a distributed contention-based mechanism or polled channel access mechanism for transmissions during intervals, wherein the distributed contention based mechanism and the polled channel access mechanism are configured by the WWAN.

12. The method of claim 1, further comprising receiving the proximity discovery information from the WWAN at the first UE and the second UE using radio resource control (RRC) messaging.

13. The method of claim 1, further comprising receiving the proximity discovery information from the WWAN at the first UE and the second UE, wherein the proximity discovery information comprises:
 a carrier frequency for the D2D communication channel;
 a bandwidth for the D2D communication channel;
 a power level for the D2D communication channel; and
 transmission intervals for communication in the D2D communication channel.

14. The method of claim 1, further comprising receiving the proximity discovery information and D2D channel parameters from the WWAN at the first UE and the second UE using management level signaling of the WLAN.

15. The method of claim 1, further comprising a plurality of UEs configured to communicate with at least one of the first UE and the second UE via the D2D communication channel.

16. The method of claim 1, further comprising forming the D2D communication channel between the first UE and the second UE, wherein the licensed frequency band operates in a radio frequency band designated for public safety.

17. A user equipment operable to establish a device to device (D2D) communication radio link, comprising:
 a proximity discovery module configured to receive discovery information from at least one of a wireless wide area network (WWAN) and a wireless local area network (WLAN) to assist in establishing a D2D communication channel with at least one additional UE; and
 a D2D communication module configured to establish the D2D communication channel using a wireless local area network (WLAN) D2D standard with the at least one additional UE using the discovery information, wherein the D2D communication channel is established in a licensed radio frequency band and is managed by the WWAN.

18. The UE of claim 17, wherein the discovery information comprises:
 a D2D communication channel carrier frequency in the licensed radio frequency band;
 a D2D communication channel bandwidth;
 a D2D communication channel power; and
 transmission intervals for communication in the D2D communication channel.

19. The UE of claim 18, wherein the D2D communication channel bandwidth is selected from the group consisting of 1 MHz, 2 MHz, 4 MHz, and 16 MHz.

20. The UE of claim 17, wherein the D2D communication channel is formed using a WLAN standard selected from the group of standards consisting of: Institute of Electronics and Electrical Engineers (IEEE) 802.11a, 802.11b, 802.11g, 802.11n, 802.11ah, and IEEE 802.15.

21. The UE of claim 18, wherein a distributed contention-based mechanism or polled channel access mechanism is used to select the transmission intervals, wherein the distributed contention based mechanism and the polled channel access mechanism are configured by the WWAN.

22. A non-transitory machine readable storage medium comprising a plurality of instructions adapted to be executed to implement the method for establishing a device to device (D2D) communication channel, comprising:
 transmitting discovery information to a first user equipment (UE) and a second UE from a wireless wide area network (WWAN);
 establishing a licensed narrow-band (LNB) WiFi connection between the first UE and the second UE in a licensed portion of a radio frequency band using, at least in part, the discovery information and using a wireless local area network (WLAN) D2D standard; and
 managing the LNB WiFi connection using the WWAN.

23. The non-transitory machine readable storage medium of claim 22, further comprising transmitting the discovery information to the first UE and the second UE using at least one of: broadcasting a new system information block (SIB) and using dedicated radio resource control (RRC) signaling to transmit an RRCConnectionReconfiguration message to each of the first UE and the second UE.

24. The non-transitory machine readable storage medium of claim 22, wherein managing the LNB WiFi connection using the WWAN further comprises using a distributed contention-based mechanism or polled channel access mechanism to select the transmission intervals, wherein the distributed contention based mechanism and the polled channel access mechanism are configured by the WWAN.

25. The non-transitory machine readable storage medium of claim 22, further comprising establishing the licensed narrow-band (LNB) WiFi connection between the first UE and the second UE in the licensed portion of the radio frequency band, wherein the licensed portion of the radio frequency band is designated for public safety.

26. The non-transitory machine readable storage medium of claim 22, further comprising establishing the LNB WiFi connection between the first UE and the second UE with a bandwidth of 1 MHz, 2 MHz, 4 MHz, or 16 MHz.

27. The non-transitory machine readable storage medium of claim 22, further comprising forming the LNB WiFi connection using a WLAN standard selected from the group of standards consisting of: Institute of Electronics and Electrical Engineers (IEEE) 802.11a, 802.11b, 802.11g, 802.11n, 802.11ah, and IEEE 802.15.

28. The non-transitory machine readable storage medium of claim 22, further comprising transmitting the discovery information to the first UE and the second UE from a WLAN in communication with the WWAN.

* * * * *